United States Patent
Mejia

(10) Patent No.: US 8,947,978 B2
(45) Date of Patent: Feb. 3, 2015

(54) SYSTEM AND METHOD FOR ESTIMATING THE DIRECTION OF ARRIVAL OF A SOUND

(75) Inventor: Jorge Mejia, Chatswood (AU)

(73) Assignee: Hear IP Pty Ltd., Melbourne (AU)

(*) Notice: Subject to any disclaimer, the term of this patent is extended or adjusted under 35 U.S.C. 154(b) by 302 days.

(21) Appl. No.: 13/375,554

(22) PCT Filed: Aug. 10, 2010

(86) PCT No.: PCT/AU2010/001016
§ 371 (c)(1),
(2), (4) Date: Dec. 1, 2011

(87) PCT Pub. No.: WO2011/017748
PCT Pub. Date: Feb. 17, 2011

(65) Prior Publication Data
US 2012/0127832 A1 May 24, 2012

(30) Foreign Application Priority Data

Aug. 11, 2009 (AU) .................................. 2009903730

(51) Int. Cl.
*G01S 3/80* (2006.01)
*H04R 25/00* (2006.01)
*G01S 3/808* (2006.01)

(52) U.S. Cl.
CPC .............. *H04R 25/407* (2013.01); *G01S 3/808* (2013.01)
USPC ......................................................... 367/124

(58) Field of Classification Search
CPC .............................. G01S 3/808; H04R 25/407
USPC ................................................. 367/124, 126
See application file for complete search history.

(56) References Cited

U.S. PATENT DOCUMENTS

| | | | |
|---|---|---|---|
| 4,198,705 A | 4/1980 | Massa | |
| 7,260,022 B2* | 8/2007 | Schliep et al. | 367/124 |
| 2005/0063553 A1 | 3/2005 | Ozawa | |
| 2009/0304188 A1* | 12/2009 | Mejia et al. | 381/23.1 |
| 2010/0310084 A1* | 12/2010 | Hersbach | 381/71.6 |
| 2010/0329080 A1* | 12/2010 | Frank et al. | 367/99 |
| 2011/0293108 A1* | 12/2011 | Mejia et al. | 381/92 |
| 2012/0127832 A1* | 5/2012 | Mejia | 367/124 |
| 2013/0223644 A1* | 8/2013 | Van Hoesel et al. | 381/92 |

FOREIGN PATENT DOCUMENTS

| | | | | |
|---|---|---|---|---|
| EP | 2063419 A1 | 5/2009 | | |
| GB | 0900929 | * 3/2009 | | |
| GB | 0900929 | * 7/2010 | ............... | G01S 5/22 |
| JP | 2000035474 A | 2/2000 | | |
| WO | 93/13590 A1 | 7/1993 | | |
| WO | 2008/138365 A1 | 11/2008 | | |

OTHER PUBLICATIONS

Yusuke Hioka, Nozomu Hamada, DOA Estimation of Speech Signal using Equilateral-Triangular Microphone Array, Eurospeech 2003—Geneva, pp. 1717-1720, School of Integrated Design Engineering Keio University, Japan.
Supplementary European Search Report issued in corresponding European Application No. 10 807 786.8 mailed on Nov. 22, 2013.

* cited by examiner

*Primary Examiner* — Daniel Pihulic
(74) *Attorney, Agent, or Firm* — Davis & Bujold, PLLC; Michael J. Bujold

(57) ABSTRACT

A system and method for estimating the direction of arrival of sounds. One method including the steps of: forming a reference signal; detecting sound with two or more spatially separated, directional or spatially separated directional, microphones to produce two or more output signals; calculating the relationships between each of the two or more output signals and the reference signal; and estimating the direction of arrival based on differences between the relationships.

7 Claims, 8 Drawing Sheets

SYSTEM AND METHOD FOR ESTIMATING THE DIRECTION OF ARRIVAL OF A SOUND

This application is a National Stage completion of PCT/AU2010/001016 filed Aug. 10, 2010, which claims priority from Australian patent application serial no. 2009903730 filed Aug. 11, 2009.

TECHNICAL FIELD

The present invention relates to the field of sound direction detection.

INCORPORATION BY REFERENCE

The information in the specifications filed in relation to International patent applications nos. PCT/AU2007/000764 (WO2007/137364) & PCT/AU2009/001566 (WO2010/051606) are hereby incorporated herein by reference.

BACKGROUND TO THE INVENTION

One technique used in direction of arrival systems operating in head wearable devices is to combine microphone output signals from the left and right sides of the head to determine the delay between sounds present in the microphone outputs. When sounds emanate from the medial (front or rear) region of the wearer, there is little delay between the microphone output signals. However this delay is largest when sounds emanate from the one side of the head. The delay increases monotonically from the medial region to either lateral region. This monotonic increase can be translated into direction of arrival of sounds with reference to the midline location between both ears.

Another technique relies on the shadowing effect of the human head. The head casts a shadowing effect for sounds located on opposite sides of the head. Due to this head shadowing effect there can be more than 20 dB level differences between microphone output signals. The level difference also decreases monotonically as the sound moves from the side to the midline location between both ears. These two basic mechanisms have been used in direction of arrival algorithm based on wearable hearing devices.

Numerous techniques have been tried to compare left and right microphone output signals and derive a direction of arrival estimate. These techniques include; Correlation, Maximum Likelihood (covariance minimisation), Multiple Signal Classification (MUSIC), Estimation of Signal Parameters using Rotational Invariance Techniques (ESPRIT) or Eigen decomposition, and Matrix pencil using an array manifold or triangulation. However, these techniques only operate successfully in relatively quiet environments.

For instance, a common technique for direction of arrival relies on sensory microphone arrays whereby the cross-correlation between the microphone output signals is calculated to determine the delay at which the maximum output power or peak occurs. In the presence of multiple sound sources these systems fail to continuously and accurately estimate the direction of arrival of a target sound present in the environment. Instead the estimates reflect the direction of arrival of dominant sounds. However due to temporal fluctuation characteristics of different sound sources the dominant sound typically changes from time to time, creating ambiguities in the estimates.

This is a particular problem for applications in which the constant and accurate detection of a target sound sources present in an arbitrary spatial location in space is required. For example, head-wearable devices such as hearing aids and hearing protectors may integrate bilateral beamformer technology to improve the Signal-to-Noise (S/N) ratio available to listeners and in the process remove the localisation cues. In such systems the direction of arrival of a desired target sound may be needed to reconstruct the localisation cues for listeners using, for instance, virtual auditory space reconstruction techniques.

There remains a need for improved direction of arrival techniques.

SUMMARY OF THE INVENTION

In a first aspect the present invention provides a method of estimating the direction of arrival of a sound including the steps of: forming a reference signal; detecting sound with two or more spatially separated, directional or spatially separated directional, microphones to produce two or more output signals; calculating the relationships between each of the two or more output signals and the reference signal; and estimating the direction of arrival based on differences between the relationships.

The reference signal may be formed by detecting sound with a dedicated reference signal microphone.

The reference signal may be formed by way of a beamformer technique.

The step of estimating the direction of arrival based on differences in the relationships may include the step of calculating interaural time differences.

The step of calculating interaural time differences may involve the use of a time correlation technique.

The step of estimating the direction of arrival based on differences in the relationships may include the step of calculating interaural level differences.

The step of calculating interaural level differences may involve the use of power difference measures.

The step of calculating the relationships may be carried out across multiple frequency channels.

The method may further include the step of comparing the distribution of direction of arrival estimates based on high frequency sounds with the distribution of direction of arrival estimates derived from low frequency sounds.

In a second aspect the present invention provides a system for estimating the direction of arrival of sounds, the system including forming means for forming a reference signal; detection means for detecting sound with two or more spatially separated, directional, or spatially separated directional microphones to produce two or more output signals; calculating means for calculating the relationships between each of the two or more output signals and the reference signal; and estimation means for estimating the direction of arrival based on differences between the relationships.

In a third aspect the present invention provides a method of estimating the direction of arrival of a sound including the steps of: detecting sound with two or more spatially separated, directional, or spatially separated directional microphones to produce two or more output signals; calculating time and level differences between the two or more output signals; and estimating the direction of arrival of the sound based on a combination of the time and level differences.

The step of calculating time and level differences may be carried out across multiple frequency channels.

The step of combining the time and level differences may involve a weighted combination of the time delay and level difference measures.

The step of calculating level differences may be predominantly carried out on high frequency sounds.

The step of calculating time differences may be predominantly carried out on low frequency sounds.

The method may further include the step of comparing the distribution of direction of arrival estimates based on high frequency sounds with the distribution of direction of arrival estimates derived from low frequency sounds.

In a fourth aspect the present invention provides a system for estimating the direction of arrival of a sound including: detection means for detecting sound with two or more spatially separated, directional, or spatially separated directional microphones to produce two or more output signals; calculating means for calculating time and level differences between the two or more output signals; and estimation means for estimating the direction of arrival of the sound based on a combination of the time and level differences.

In a fifth aspect the present invention provides a computer program product including software instructions to cause a computing device to carry out a method or to embody a system according to any of the first to fourth aspects of the invention.

Optionally the reference signal may be produced by using a template as in the acoustic tracking of a well known sound source, for example pulse trains or pure tones.

When the reference signal is produced by bilateral beamforming it is possible to steer the look direction of the beam to a desired direction in space and for the width of the beam to encompass a range of directions around the look direction. Optionally multiple concurrent bilateral beamformers may operate to produce multiple reference signals, each of which can be used to determine the direction of arrival of a dominant sound source within a given spatial region.

When the reference signal is produced by multiple radio links, it is possible to create multiple reference signals, each of which can be used to determine the direction of arrival of the dominant sound available through each of the radio links.

Optionally, the step of combination may be performed by weighting and coherently adding interaural measures across multiple channels. Optionally the computation may be performed for the time and level difference measures independently and the results weighted and coherently added in order to produce one single output.

The disclosed method may include the step of using the direction of arrival estimate to re-introduce the localisation cues to listeners. Optionally the direction of arrival estimates may be used to control external devices, such as surveillance cameras and robotic arms.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENT

Figure 1:
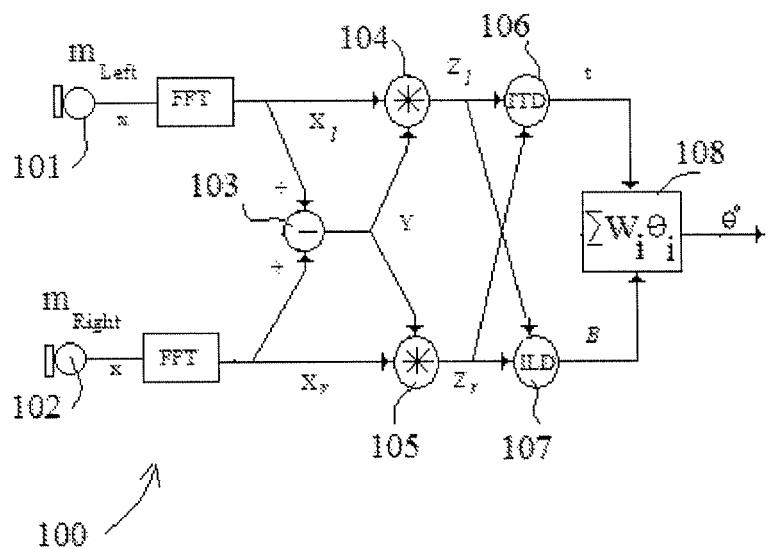
FIG. 1 is a block diagram of an embodiment of a direction of arrival estimator according to the invention.

The preferred embodiment of the present invention is shown in FIG. 1, 100. The system is shown in schematic form as functional blocks in a digital signal processing scheme. Each functional block represents a calculation or data manipulation step.

System 100 includes detection means for detecting sounds in the form of omni-directional or directional microphones or microphone arrays 101 and 102. System 100 further includes forming means 103 for forming a reference signal Y. Calculation and estimation means are embodied in computer hardware controlled by software instructions. Appropriate hardware for carrying out the methods described herein is available and can be specified by appropriate persons skilled in DSP techniques. Software for conducting the methods described herein can be prepared by skilled persons based on the teachings and mathematical functions described herein.

Referring to FIG. 1, the outputs from the left 101 and right 102 microphones are transformed into multichannel signals, for example using a Fourier transform technique (FFT). The subsequent analysis of the preferred embodiment will assume that these multichannel signals for the left $X_L$ and for the Right $X_R$ as well as for the reference signal Y are available. However it should be clear to those skilled in the art that the processing can be performed in the time domain using multiple filter banks. Optionally the computation may be performed on the broadband signals.

In FIG. 1, 100, the Left $X_L$ signal and the right $X_R$ signal are independently combined, 104 and 105, with the reference signal Y to calculate the relationships between the $X_L$ signal and the right $X_R$ and the reference signal Y signal in the form of subsidiary left $Z_L$ and right $Z_R$ signals. The combination process is computed according to Eq.1. Optionally the combination process may be computed by correlating the left and right signals with the reference signal in the time domain to produce left and right subsidiary signals. It should be clear to those skilled in the art that multiplication in the FFT space equates to convolution in the time domain, thus the operations are inter-exchangeable.

$$Z_L(k) + X_L(k) \cdot Y(k) / |X_L(k) \cdot X_L^*(k)| \qquad \text{(Eq.1)}$$

$$Z_R(k) + X_R(k) \cdot Y(k) / |X_R(k) \cdot X_R^*(k)|$$

Where k denotes a frequency bin, with a bandwidth $\Delta\Omega$, $\|$ denotes absolute value and the * denotes complex conjugate.

The interaural time delay estimation process, 106, may be implemented using a generalized phase transform functions. The computation provides an estimate of the interaural time delay τ (seconds) corresponding to the dominant sound source location. This interaural time delay is found for a given time delay step size. This step size is defined in Eq.2.

$$\Delta\tau = 2 \cdot \frac{ITD_{max}}{I_{max}} \quad \text{(Eq.2)}$$

Where $ITD_{max}$ corresponds to the maximum interaural time delay, typically not exceeding 0.8 milliseconds, and $I_{max}$ is the number of quantisation levels relating to the interaural spatial sensitivity of $\tau$, where $-0.8<\tau<0.8$ milliseconds.

The time delay evaluated at different steps is used to calculate the phase rotation required to minimise the phase difference between left and right outputs. The quantity, R(I), as given in Eq. 3, varies with the phase rotation of the signal $Z_L$ relative to the signal $Z_R$, as I is varied from 1 to $I_{max}$.

$$R(l) = \left\{ \frac{1}{(k_{max} - k_{min})} \sum_{k=kmin}^{kmax} \frac{Z_L(k) \cdot Z_R^*(k) \cdot e^{j \cdot k \cdot (\Delta \Omega) \cdot l(\Delta \tau)}}{|Z_L(k) \cdot Z_R(k)^*|} \right\} \quad \text{(Eq.3)}$$

Thus, the time delay for a given dominant sound source location is found by estimating the delay step I at which R(I) is maximised, where $\tau = l \cdot \Delta\tau$. In the preferred embodiment, this delay is normalised as given in Eq.4.

$$\tau_i = \frac{l \cdot \Delta\tau}{ITD_{max}} \quad \text{(Eq.4)}$$

The interaural level difference process, 107, may be implemented using a generalized multichannel normalised level difference computed over adjacent frequency channels, as given in Eq.5, where in the preferred embodiment ρ denotes a frequency band dependent weighting factor.

$$\beta_i = \rho \cdot \frac{1}{(k_{max} - k_{min})} \sum_{k=k_{min}}^{k_{max}} \left( \frac{|Z_L(k)| - |Z_R(k)|}{|Z_L(k)| + |Z_R(k)|} \right) \quad \text{(Eq.5)}$$

The combination process, 108, may be implemented using weighted addition across all frequency bands, to reduce the effects of measurement inaccuracy and noise by taking advantage of inter-frequency redundancies in the estimate, as shown in Eq.6.

$$\mu_\beta(t) = \sum_i W_i \cdot |\beta_i|$$
$$\mu_\tau(t) = \sum_i W_i \cdot |\tau_i| \quad \text{(Eq.6)}$$

Where $W_i$ are frequency band dependent weights based on a linear addition across i frequency bands and t demotes time. Optionally frequency dependent adaptive weights may be used on the correlation across bands.

The final direction of arrival estimate can be updated according to Eq.7

$$DOA(t) = \gamma \cdot \mu_\beta(t) + (1-\gamma) \cdot \mu_\tau(t) \quad \text{(Eq.7)}$$

where the weights γ may be updated according to Eq.8. This equation operates to minimise the variance in the final output estimate, e.g. providing most emphasis to variables $\mu_\beta$ or $\mu_\tau$ that has the least variation in its recent history.

$$\gamma \cdot = \frac{VAR(\mu_\tau(t))}{VAR(\mu_\beta(t)) + VAR(\mu_\tau(t))} \quad \text{(Eq.8)}$$

Optionally the instantaneous DOA(t) estimates are further smoothed over time as given in Eq.9

$$DOA = \alpha \cdot DOA(t) + (1-\alpha) \cdot DOA(t-\Delta) \quad \text{(Eq.9)}$$

Where α is an exponential weighting factor ranging from 0 to 1.

In the preferred embodiment, the time delay is determined at frequencies not exceeding 10000 radians/second (1.6 kHz) whereas the level difference is determined over frequencies greater than 10000 radians/second. It should be obvious to those skilled in the art that other combinations of frequencies to determine time delay and level difference are possible.

Figure 2:
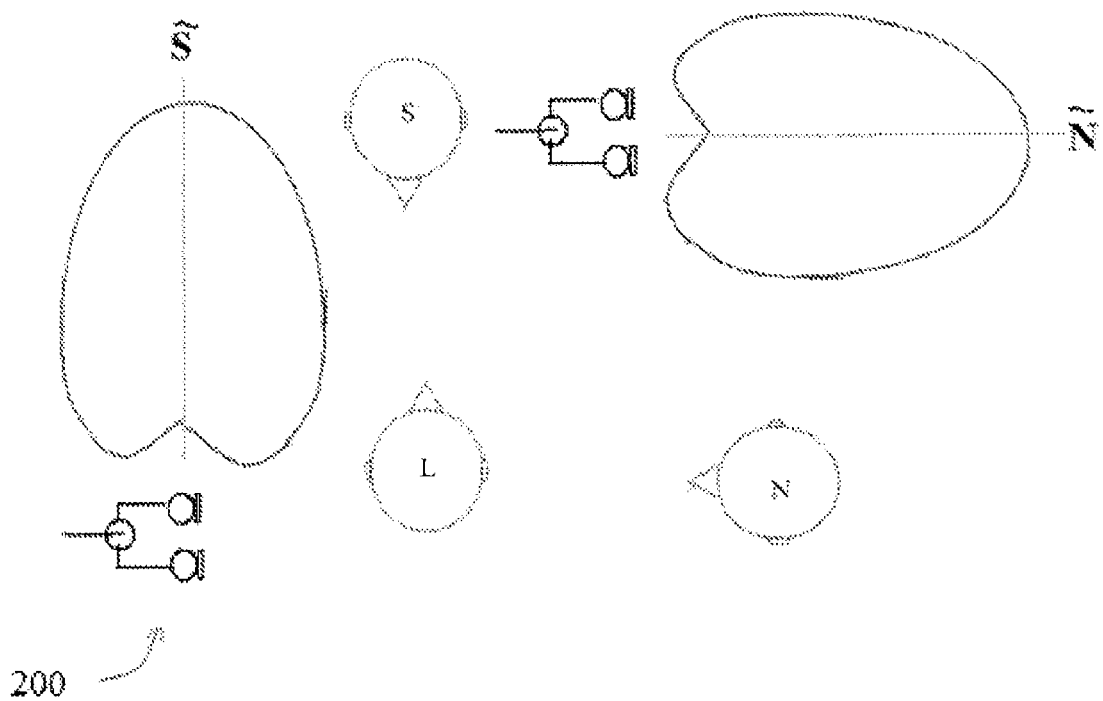
FIG. 2 illustrates the directional responses to provide emphasis to an arbitrary spatial region.

FIG. 2, 200 illustrates a technique of providing spatial emphasis to a sound source located in an arbitrary spatial location. The figure shows a listener L having a head wearable device fitted with microphone arrays, providing maximum spatial emphasis to a first sound direction, denoted by S, or alternatively a second sound direction, denoted by N. In one embodiment, the output from the microphone array provides a reference signal in real acoustic listening situations.

Figure 3:
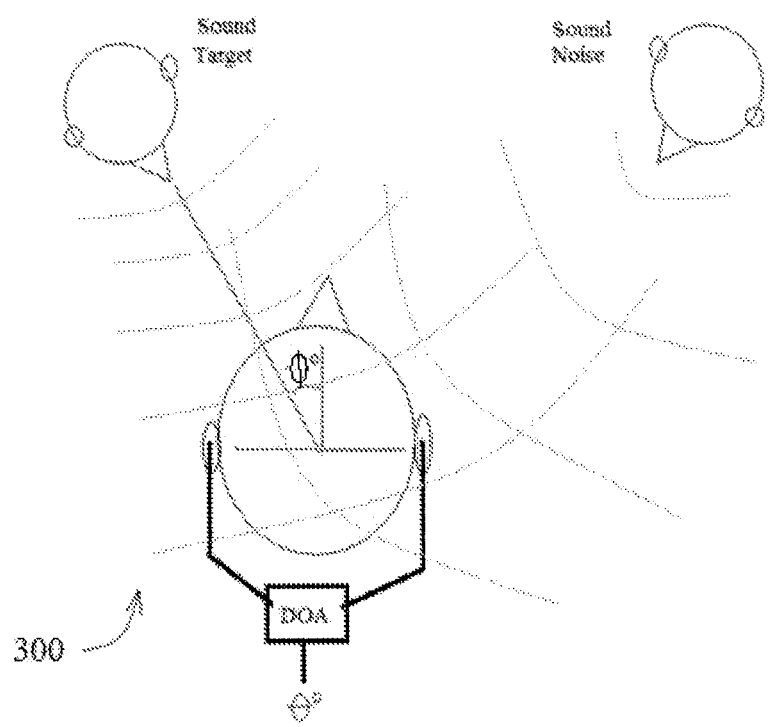
FIG. 3 illustrates the task of estimating the direction of arrival in the presence of a secondary sound source.

FIG. 3, 300 illustrates the principle behind direction of arrival estimator whereby the aim is to minimise the error between estimated direction of arrival θ°, and the actual direction of arrival ϴ°, with both angles measured relative to the frontal medial axis. The problem is compounded by the presence of a noise sound source with the same acoustic properties as the target sound source.

Figure 4:
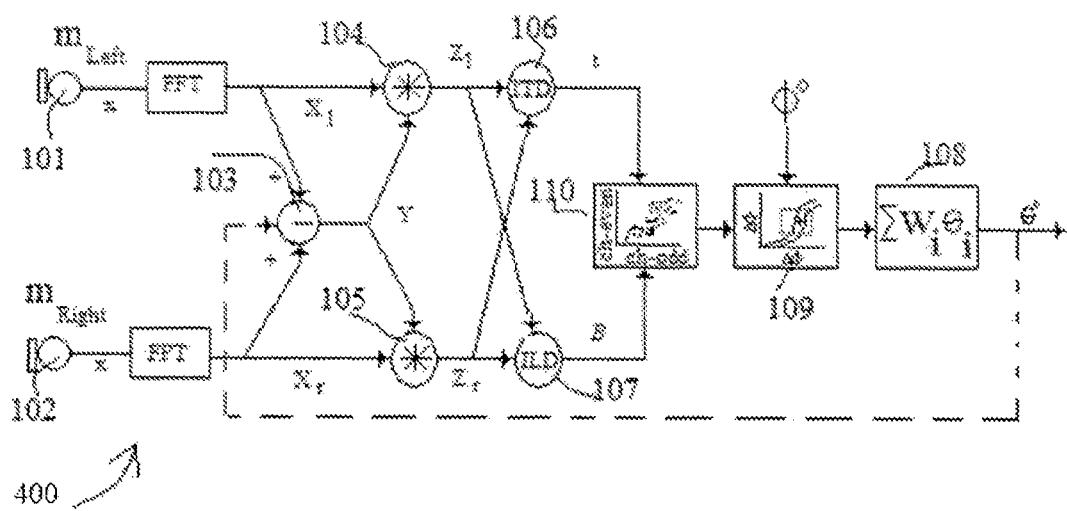
FIG. 4 is a block diagram of an optional extension of the direction of arrival estimator of FIG. 1 which further includes noise reduction filters with feedback.
Figure 6:
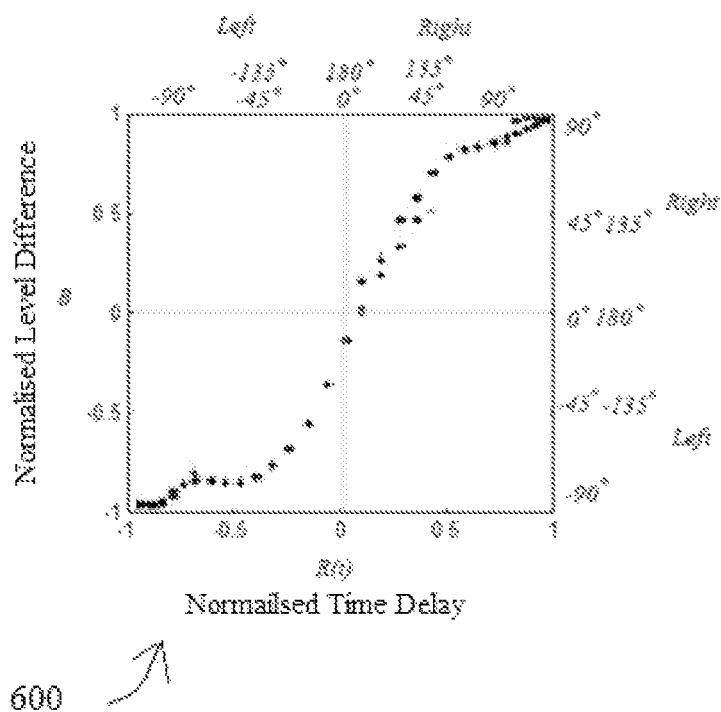
FIG. 6 illustrate a plot produced from the orthonormal transformation of interaural time and level difference measures.
Figure 7:
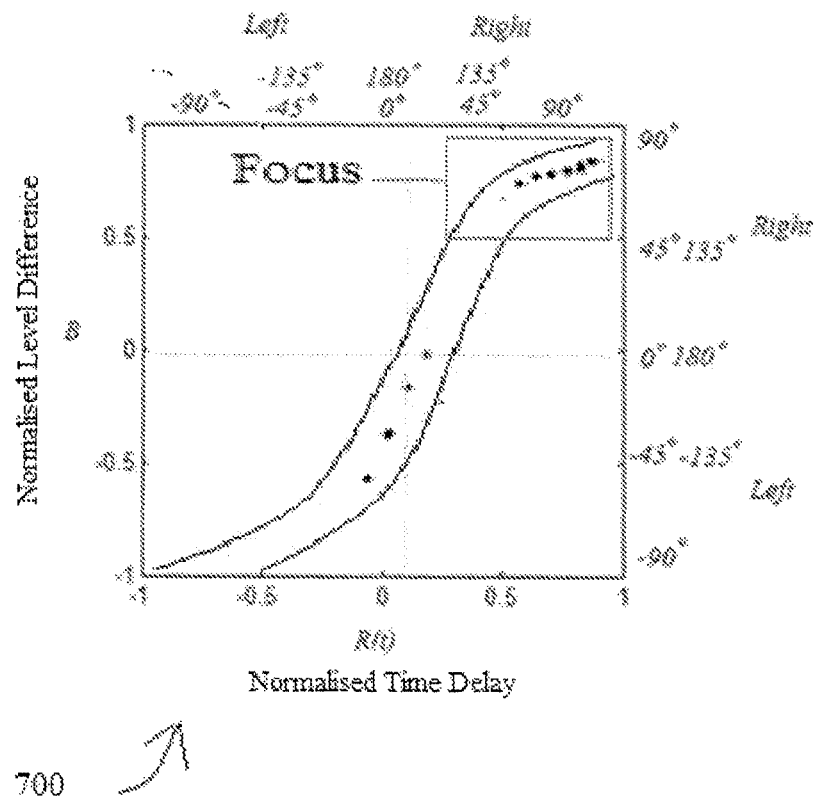
FIG. 7 illustrates a plot of a spatial filter technique used to remove noise and redundancies for the directional of arrival estimates.

FIG. 4, 400 illustrates an extension to the embodiment of FIG. 1. The error in the estimate can be reduced by further filtering the interaural measures. These filters are produced by plotting the expected normalized time versus the level difference measures as shown in FIG. 6, 600. The data points observed in the figure were obtained from measures obtained in an anechoic environment and corresponding to a single sound source moving around the head. Thus a map of the allowable region on the time-level plane is defined around these expected values. As further shown in FIG. 7, 700, the allowable region is defined by lower and upper spatial boundaries or filters. In addition the spatial boundaries can be further constrained, as illustrated in FIG. 7, 700, by reducing the look up region. In the preferred embodiment this region is further defined to be no greater than half the power beamwidth based on the bilateral beamformer response. Optionally the look up region can be user defined.

With further reference to FIG. 4, 400 an optional feedback path is included whereby the beamformer may be automatically steered to improve its efficiency relative to the location of a desired target sound source. This feedback also enables a desired target source to automatically be tracked as the source moves or the orientation of the device containing the direction of arrival indicator changes.

Figure 5:
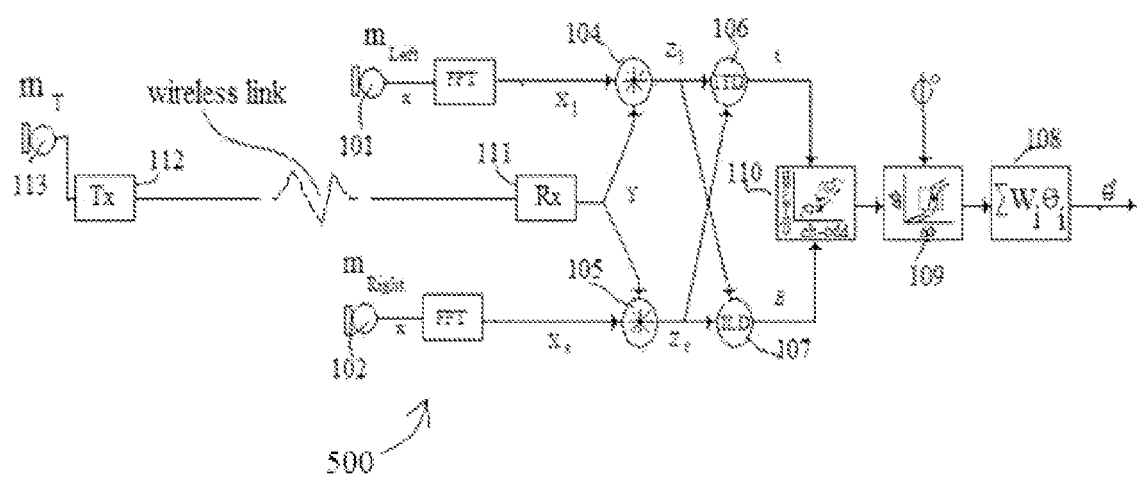
FIG. 5 is a block diagram of an optional extension of the direction of arrival estimator of FIG. 1 which further includes a radio link to produce a reference signal.

FIG. 5, 500 illustrates a further extension to the preferred embodiment. Alternatively to a beamformer, the detection means to determine a reference signal may be produced with a radio link. In this radio link a microphone 113 located in the proximity of an acoustic source may be transmitted 112 via a wireless or wirelink to a receiver 111 whereby the reference signal is produced. The process of detecting its spatial location is subsequently determined through process 100 or optionally process 400.

Figure 8:
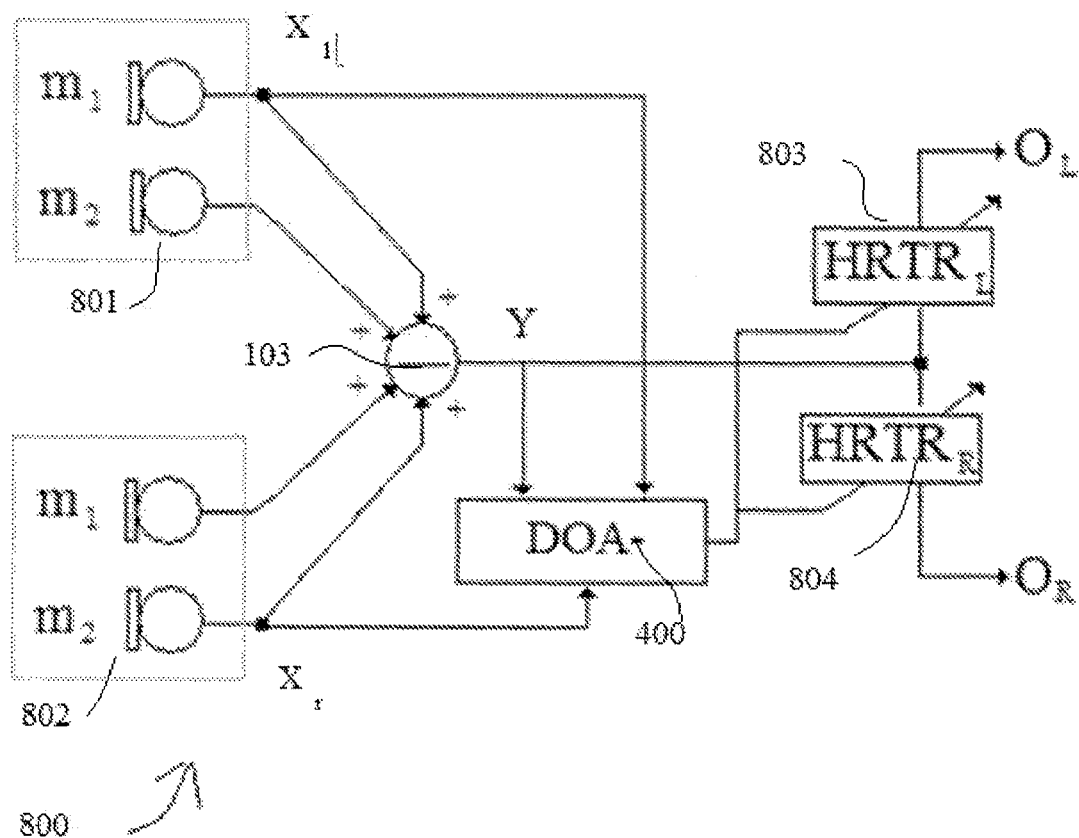
FIG. 8 presents an application of the invention operating as a spatial enhancement algorithm in head wearable devices.

FIG. 8, 800 illustrates an application of the invention, whereby microphone arrays mounted on each side of the head of a wearer, are combined 103 to produce a super-directional response. The output from this response Y is combined with the left and right outputs $X_L$ and $X_R$ in the direction of arrival estimator 400 to determine the spatial location of the dominant sound present in Y. The direction of arrival estimate 400 is used to index pre-rerecorded head-related transmission response filter for the left 803 and right 804 sides of the head independently to restore the localisation cues available to listeners. Optionally spatial restoration is applied by delaying the left or right signals such that listeners experience lateralisation of sounds. Optionally spatial restoration can be introduced by calculating $Z_L$ and $Z_R$ over time and applying these values as spatial restoration filters for the left and right side of the head Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A method of estimating a direction of arrival of a sound including the steps of:
   detecting sound with two or more spatially separated, directional, or spatially separated directional microphones to produce two or more output signals;
   calculating time and level differences between the two or more output signals; and
   estimating the direction of arrival of the sound based on a combination of the time delay and level differences.

2. The method according to claim 1, further comprising the step of carrying the calculation of time and level differences across multiple frequency channels.

3. A method of estimating a direction of arrival of a sound including the steps of:
   detecting sound with two or more spatially separated, directional, or spatially separated directional microphones to produce two or more output signals;
   calculating time and level differences between the two or more output signals; and
   estimating the direction of arrival of the sound based on a combination of the time delay and level differences, wherein the step of combining the time delay and level differences involves a weighted combination of measured time delay and level differences.

4. The method according to claim 1, wherein the step of calculating level differences being predominantly carried out on high frequency sounds.

5. The method according to claim 1, wherein the step of calculating time differences being predominantly carried out on low frequency sounds.

6. The method according to claim 1, further including the step of comparing a distribution of direction of arrival estimates based on high frequency sounds with a distribution of direction of arrival estimates derived from low frequency sounds.

7. A system for estimating a direction of arrival of a sound including:
   detection means for detecting sound with two or more spatially separated, directional, or spatially separated directional microphones to produce two or more output signals;
   calculating means for calculating time and level differences between the two or more output signals; and
   estimation means for estimating the direction of arrival of the sound based on a combination of the time and level differences.

* * * * *